United States Patent
Jung

(10) Patent No.: US 11,964,579 B2
(45) Date of Patent: Apr. 23, 2024

(54) ELECTRIC VEHICLE CHARGING SYSTEM

(71) Applicant: DAEYOUNG CHAEVI CO., LTD., Daegu (KR)

(72) Inventor: Min Kyo Jung, Daegu (KR)

(73) Assignee: DAEYOUNG CHAEVI CO., LTD., Daegu (KR)

( * ) Notice: Subject to any disclaimer, the term of this patent is extended or adjusted under 35 U.S.C. 154(b) by 389 days.

(21) Appl. No.: 17/443,212

(22) Filed: Jul. 22, 2021

(65) Prior Publication Data
US 2022/0379757 A1     Dec. 1, 2022

(30) Foreign Application Priority Data
Jun. 1, 2021   (KR) ........................ 10-2021-0071151

(51) Int. Cl.
| B60L 53/35 | (2019.01) |
| B60L 53/16 | (2019.01) |
| B60L 53/18 | (2019.01) |
| B60L 53/31 | (2019.01) |
| B60L 53/62 | (2019.01) |
| B60L 53/66 | (2019.01) |
| H02J 7/00 | (2006.01) |

(52) U.S. Cl.
CPC .............. B60L 53/35 (2019.02); B60L 53/16 (2019.02); B60L 53/18 (2019.02); B60L 53/31 (2019.02); B60L 53/62 (2019.02); B60L 53/665 (2019.02); H02J 7/0042 (2013.01); H02J 7/0048 (2020.01)

(58) Field of Classification Search
None
See application file for complete search history.

(56) References Cited

U.S. PATENT DOCUMENTS

| 9,054,539 | B2* | 6/2015 | Muller | B60L 53/31 |
| 2012/0262115 | A1* | 10/2012 | Ichikawa | B60L 58/40 320/109 |
| 2013/0257373 | A1* | 10/2013 | Mallon, IV | F16L 3/16 248/65 |
| 2014/0048638 | A1* | 2/2014 | Falk | B65H 75/4421 242/390.8 |
| 2016/0121747 | A1* | 5/2016 | Jefferies | B60L 53/16 320/109 |
| 2017/0129355 | A1* | 5/2017 | Fournier | H02J 7/00 |
| 2018/0170197 | A1* | 6/2018 | AbuGhazaleh | B60L 53/31 |
| 2019/0004309 | A1* | 1/2019 | Shuto | G02B 26/0816 |

FOREIGN PATENT DOCUMENTS

| KR | 20190130896 A | * 11/2019 | |
| WO | WO-2012171883 A1 | * 12/2012 | B60L 11/1816 |

* cited by examiner

*Primary Examiner* — Richard Isla
*Assistant Examiner* — Javier A. Bernal Sosa
(74) *Attorney, Agent, or Firm* — BROADVIEW IP LAW, PC

(57) ABSTRACT

The present invention includes a cable guide that guide a charging cable out of a rotating chamber; a rotating cylinder that is hollow inside and a form of bottom opened drum; a rotating disk, which has a fan shaped charging cable through hole and is formed from rotating cylinder's open bottom, that rotates the rotating cylinder; a fixed chamber located symmetrically below the rotating disk; a rotating support module, located under the center of the rotating disk, that rotates the rotating disk; a power module that provides torque to the rotation support module. The invention provides ease of shortening and lengthening depending on charging mode and standby mode.

15 Claims, 6 Drawing Sheets

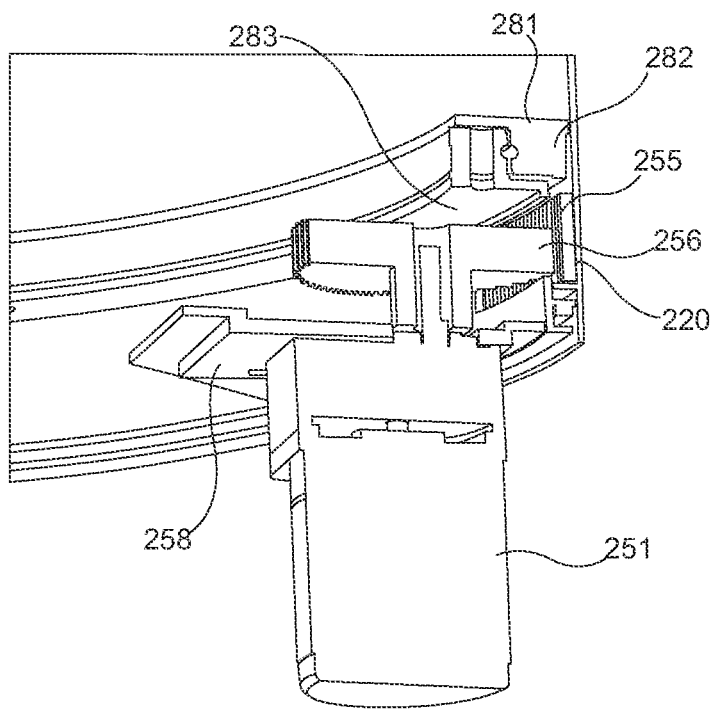
FIG. 6A
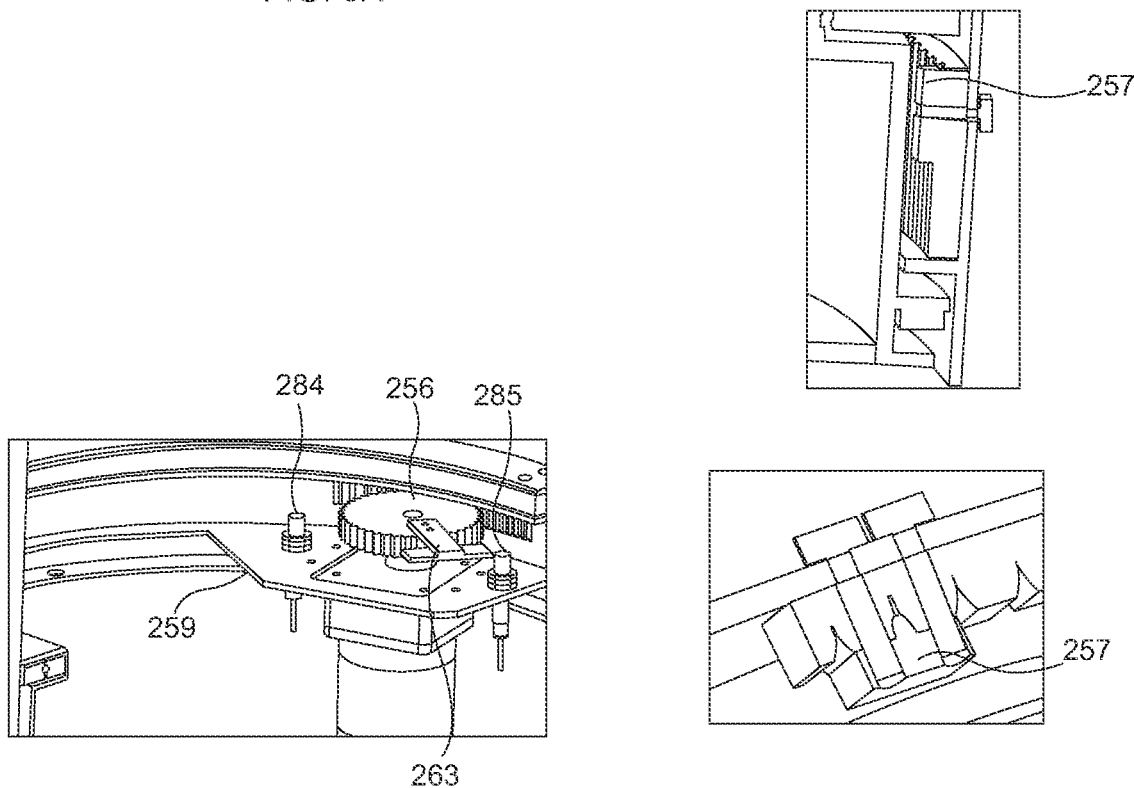
FIG. 6B
FIG. 6C

ELECTRIC VEHICLE CHARGING SYSTEM

CROSS-REFERENCE TO RELATED APPLICATION

This application claims priority to Korean Patent Application No. 10-2021-0071151 filed Jun. 1, 2021, the contents of which are incorporated herein by reference.

FIELD OF THE INVENTION

The present invention is related to a charging system for electric vehicle, and more specifically, the position of the charging cable outlet is changed while the rotating chamber is automatically rotated and reverse-rotated by an angle without a separate control, and the mode becomes either standby mode or charging mode depending on the position.

BACKGROUND OF THE INVENTION

Considering various electric vehicle types and parking position deviations of electric vehicles to be charged, a need for exposed long charging cable and a need for the charging cable to not touch the ground for long periods conflict. In addition, there is a need for a charging cable to be minimally exposed to an electric vehicle from a charging system to improve accessibility for control of a charging system.

For these reasons, various solutions have been used such as bending and folding charging cable in small circles, or winding up charging cable etc. However, it is impossible to apply such solutions to high-capacity charging cables because the cables are thick and rigid.

Hence, not bending and winding but lifting and dropping methods have been used but it is inconvenient to drop the charging cable whenever charging and lifting up the cable after done with charging.

SUMMARY OF THE INVENTION

Thus, in order to solve the above-described problems, the present invention can easily adjust the length of the charging cable exposed without a separate control by automatically rotating and reverse rotating chamber in an angle resulting the charging cable to wind and unwind. Also, the invention provides a charging system for electric vehicle that becomes standby mode or charging mode depending on the location of the charging cable outlet which is depending on the position of the Rotating chamber.

In order to achieve the above-described purposes, the rotating chamber of the charging system according to the present invention includes a cable guide guiding the charging cable out of the rotating chamber; a rotating cylinder that is hollow in a form of a drum with one side of the floor open; a rotating disk which is formed as bottom side of the rotating cylinder and open, fan shaped for the charging cable pass through, that rotates the rotating cylinder located above; a fixed cylinder formed symmetrically and located in lower body of the rotating disk; a rotating support module which rotates the rotating disk and located under center of the rotating disk; a power module that powers the rotating support module.

According to the present invention, the charging system for electric vehicle's rotating chamber rotates toward an electric vehicle once the charging socket is disengaged from the socket holding pocket which makes the charging cable lengthening toward the vehicle, and after charging is completed and the charging socket is engaged with the socket holding pocket, the rotating chamber reverse-rotates which wind the charging cable, resulting in shortening the length of the exposed charging cable, lifting up the charging cable from the ground and changing the system mode to stand by. It provides ease of access to the touch screen for a user by preventing stepping over the charging cable or tripping over the charging cable.

BRIEF DESCRIPTION OF THE DRAWINGS

FIGS. 6A-6C show an exemplary cross-sectional structural view of the rotating chamber of an embodiment of the charging system for electric vehicle.

DETAILED DESCRIPTION OF THE INVENTION

The present invention may have various modifications and embodiments. Specific exemplary embodiments are described with figures. However, this is not to limit the present invention to a particular embodiment, it should be understood that this is to includes all modifications, equivalents and substitutions. While describing each figure, relevant references were used for relevant elements.

Terms such as first, second, A, B may be used to describe various elements, but the elements should not be limited by the above terms. The terms are used only for the purpose of distinguishing one element from other.

Hereinafter, the present invention, the charging system for electric vehicles are described in detail with figures.

Figure 1:
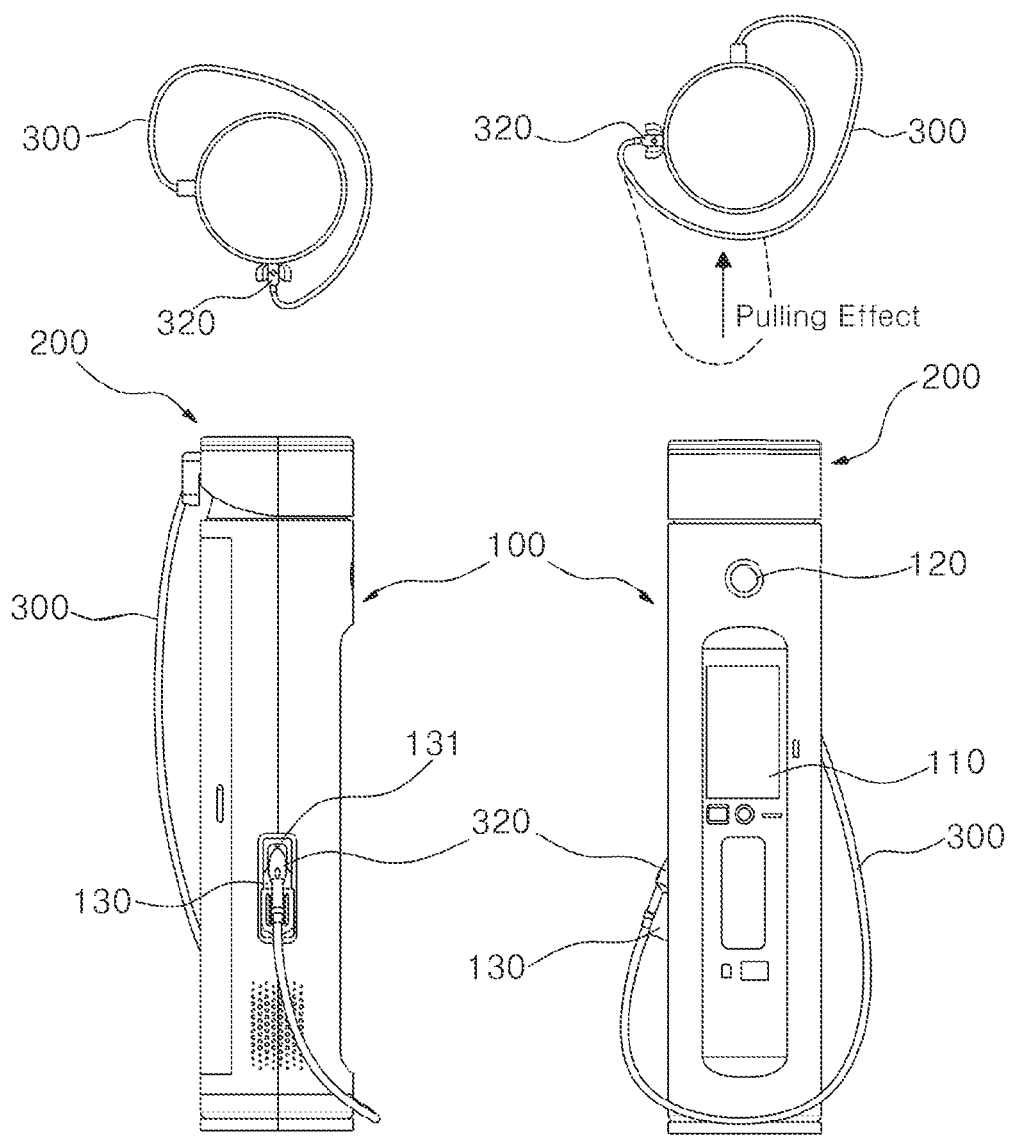
FIG. 1 is a perspective view of the charging system for electric vehicle of the present invention.

FIG. 1 includes a fixed chamber (100), a rotating chamber (200), and a charging cable (300) of the present invention, a charging system for electric vehicle.

The fixed chamber (100) includes a touch screen (110), a charging status indicator (120) and a socket holding pocket (130).

The touch screen (110) is a control screen for a driver to charge electricity to an electric vehicle and with touch operations a driver can enter various information such as vehicle models, amount of electricity, payment amount and payment methods.

The fixed chamber (100) receives unit cost for vehicle models, unit cost for electricity amount via external communication per day or per week and displays calculated payment due on the touch screen (110) according to the driver's amount choices.

The charging status indicator (120), formed in a ring shape, displays charging status in percent showing how much electricity charged or payment amount due depending on a driver's selected amount.

The socket holding pocket (130) is to lock the charging socket (32), which is an end of the charging cable (300) that connected to the rotating chamber (200). The charging socket lock sensor (131) detects whether the charging socket is locked and may display its status to the touch screen (110).

The rotating chamber (200), which is above the fixed chamber (200) and connected to the changing cable (300), rotates clockwise or counterclockwise in an angle depending on charging status or standby mode.

The charging cable (300), which is connected to the rotating chamber (200) on one end and has a charging socket (320) on the other end that engages with charging prong directly, is to be locked with the socket holding pocket (320).

Figure 2:
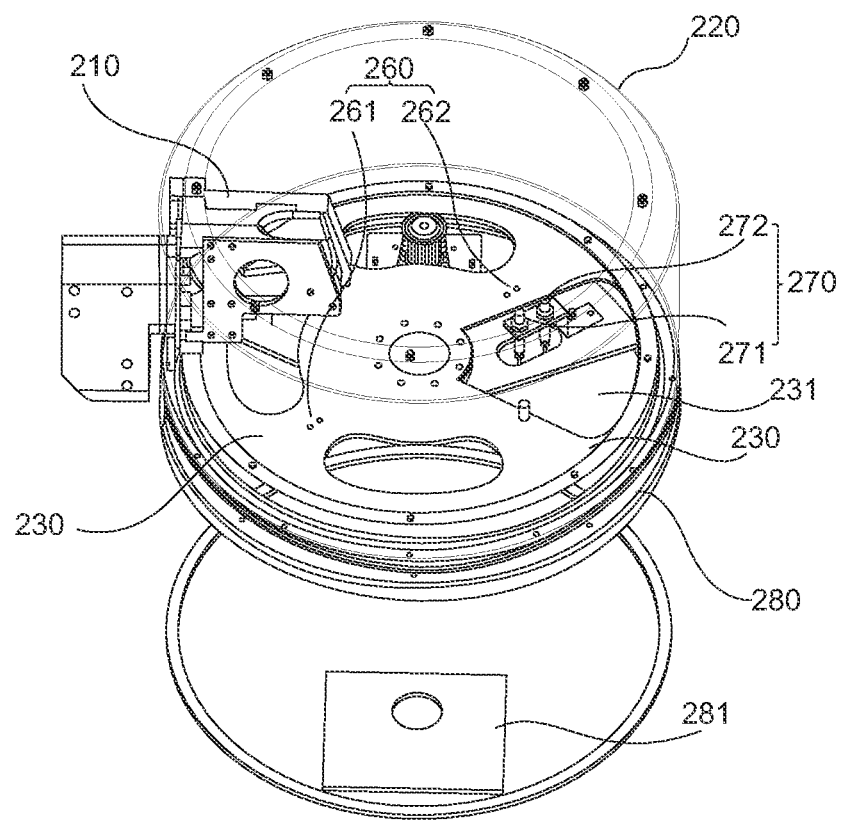
FIG. 2 is a perspective view of the upper body of the rotating chamber of the charging system of the electric vehicle.
Figure 3:
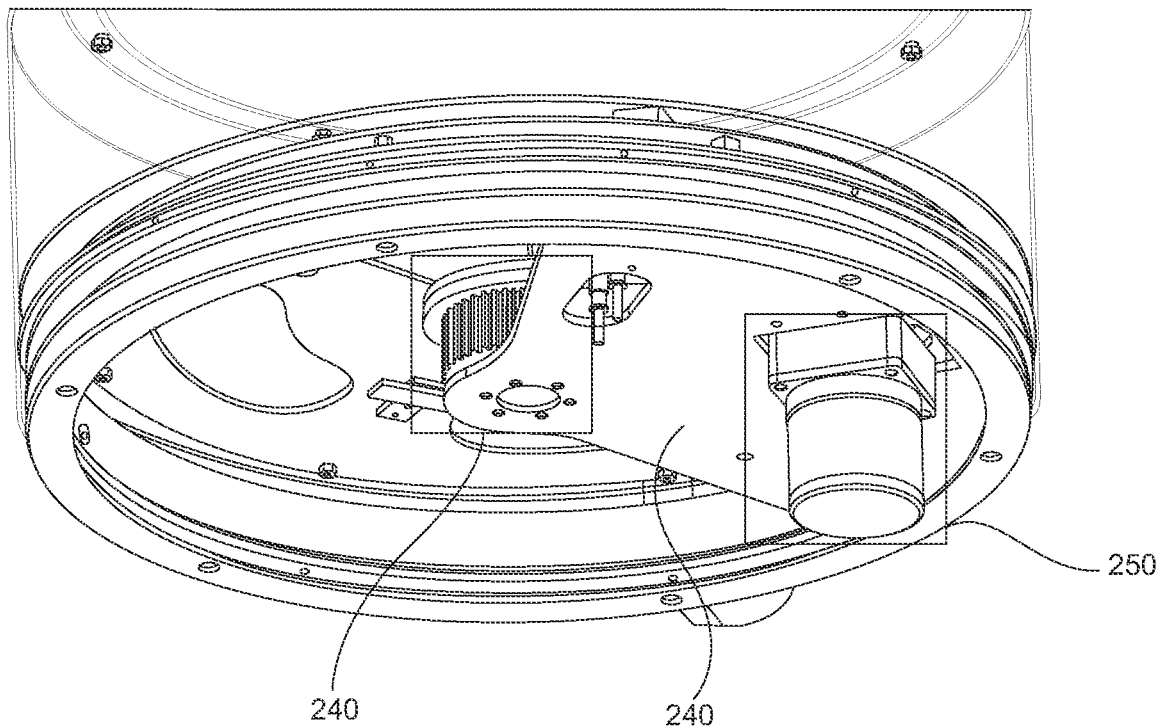
FIG. 3 is a perspective of the lower body of the rotating chamber of the charging system of the electric vehicle.
Figure 4:
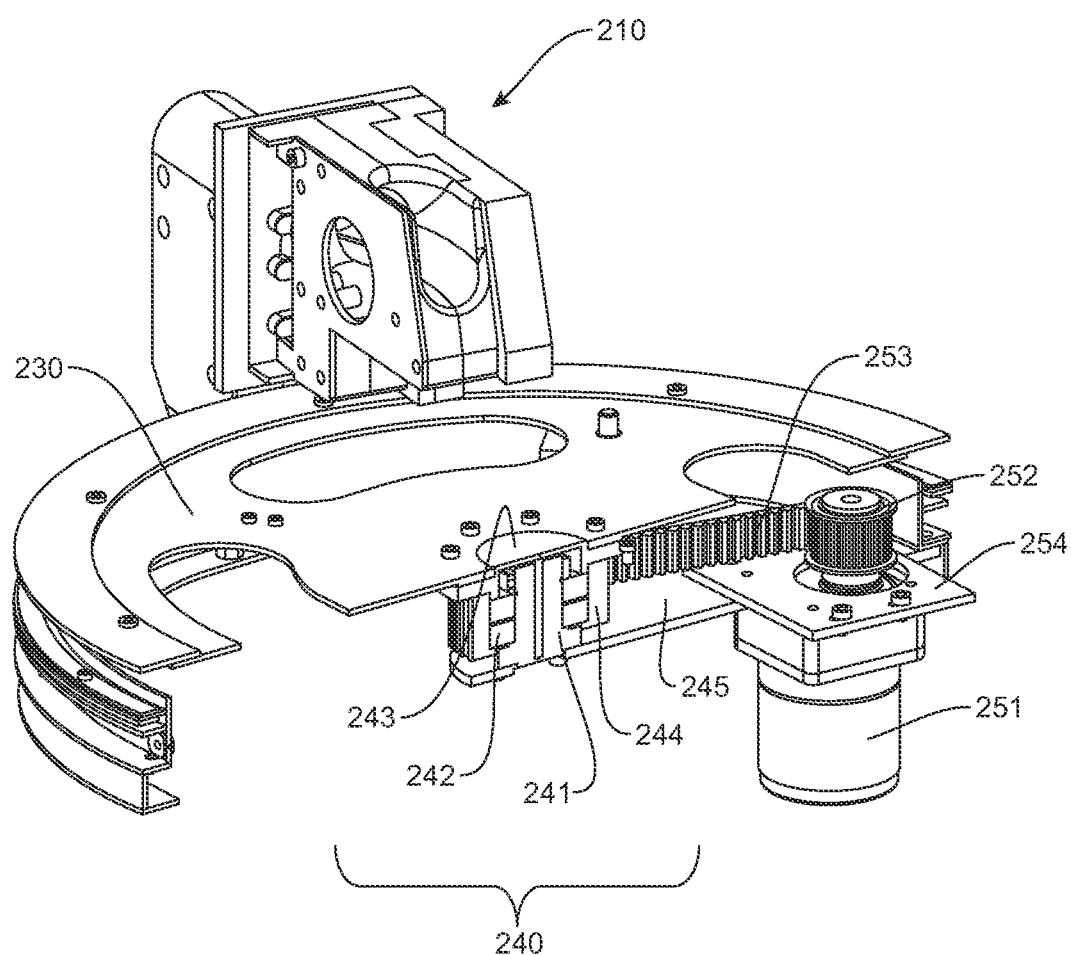
FIG. 4 is a cross-sectional-sectional view of the rotating chamber of the charging system for electric vehicle

Looking more closely at the rotating chamber (200), as shown in FIG. 2 and FIG. 3, the rotating chamber (200) includes a cable guide (210), a rotating cylinder (220), a rotating disk (230), a rotating support module (240), a power module (250), a sensor mark (260), and a rotation sensor (270).

The cable guide (210) guides the charging cable (300) out from the fix chamber (100) to the rotating chamber (200).

The rotating cylinder (220), which is hollow inside and a form of a bottom opened drum, provides enough space for the charging cable (300) to move when the rotating chamber (200) rotates.

The rotating disk (230), which is opened bottom of the rotating cylinder, rotates the rotating cylinder (220) above.

The rotating disk (230) has a fan shaped charging cable through hole.

A fixed cylinder (280) is located under the rotating disk (230) symmetrically.

The fixed cylinder (280) is attached to the top of the fixed chamber (100) and the charging cable holding bracket (281) is located in between.

The charging cable holding bracket (281) is in the fixed chamber (100) with enough distance from the rotating chamber (200) so that the charging cable which has rigidity can maintain minimum curvature.

That is, from the fixed chamber (100), the charging cable (300) gets through the charging cable holding bracket (281), then through the charging cable through hole (231), then guided outside via the cable guide (210). The charging cable through hole (231) provides a space for the moving charging cable when the rotating disk rotates in certain angle. Undescribed lateral holes in the rotating disk (230) are for reducing the weight of the rotating chamber.

The rotating support module (240) in FIG. 3 is supported by the support bracket (245) and is located under the rotating disk (230) in center. The rotating support module (240) rotates the rotating disk by receiving torque from the power module (250).

More specifically, the rotating support module (240) includes the center shaft (241) which supports the rotating disk (230) and is installed on the support bracket (245); the main pulley (244) which is fitted outside of the center shaft (241), has gear teeth on outer surface, and receives torque from the power module (250), rotates the rotating disk attached on top; the support bearing (242), fitted between the center shaft (241) and the main pulley (244), which ensures robust rotations of the main pulley (244) which attached to the rotating disk (230); and the bearing cap (243) which binds the support bearing (242) axially and prevents foreign matters entry to prevent decreasing torque and noise.

The power module (250) installed on the support bracket (245) includes a motor & decelerator (251), the first pulley and the power transfer belt (253).

The motor & decelerator (251) generates torque to rotate the rotating chamber (200).

The motor & decelerator (251) is installed via the motor bracket (254) which is under the support bracket (245). The motor bracket (254) can control tension of the power transfer belt (253).

The first pulley (252) which has gear teeth on outer surface like the main pulley (244) is connected to the motor & decelerator's rotating axis.

The power transfer belt (253) has gear teeth on inner surface like a timing belt and are connected to the first pulley (252) and the main pulley (244), both of which are having gear teeth on outer surface. This configuration makes power to transfer from the first pulley (252) to the main pulley (244).

On the other hand, the sensor mark (260) includes the first sensor mark (261) and the second sensor mark (262). The rotation sensor (270) has a rotating direction detecting sensor (271) for detecting the first sensor mark (261), and a reverse rotation detecting sensor (272) for detecting the second sensor mark (262). The rotation sensor (270) detects rotation and produces rotation stop signals.

In another embodiment of the present invention, charging system for electric vehicle, which is the rotating chamber (200) installed on top of the fixed chamber (100) that rotates in certain angle is provided.

Figure 5:
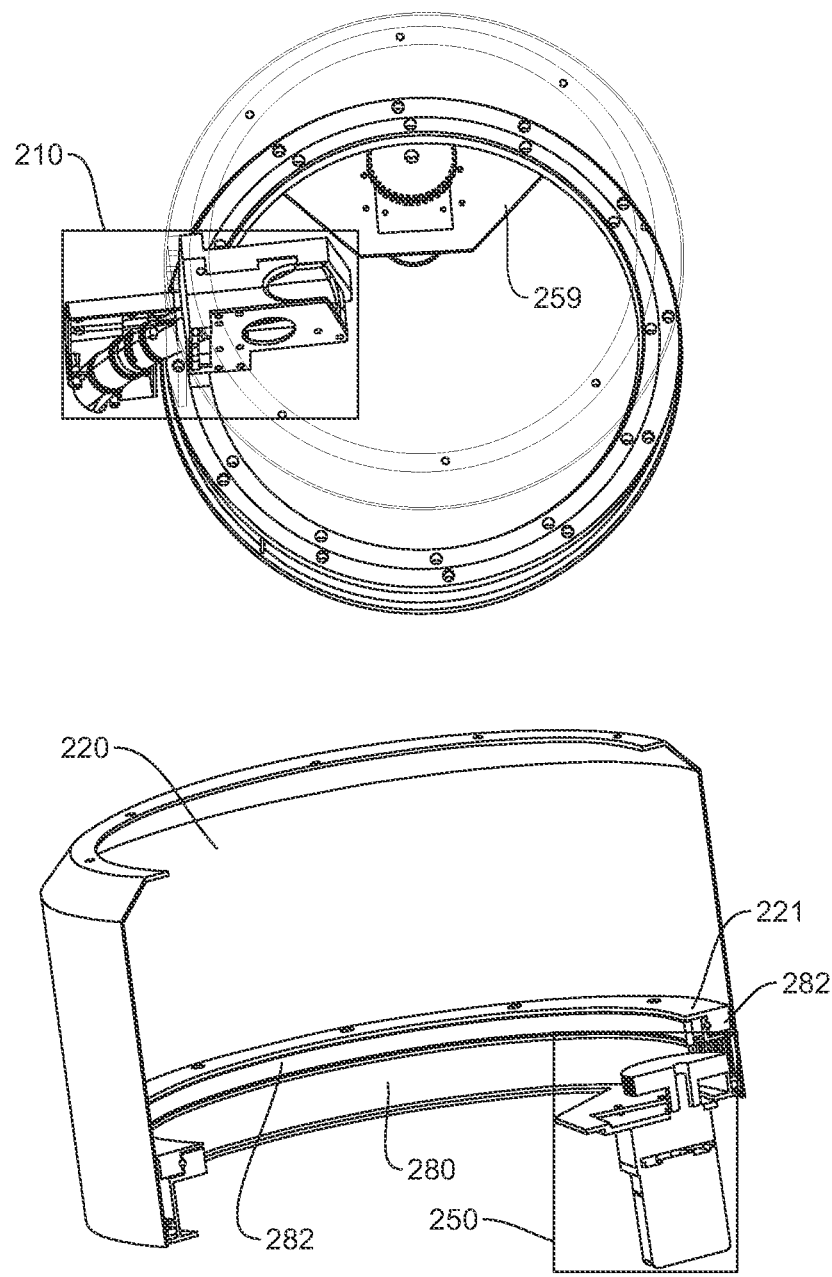
FIG. 5 is an exemplary cross-sectional structural view of the rotating chamber of an embodiment of the charging system for electric vehicle.

As shown in FIG. 5, the present invention includes the cable guide (210) installed in cable exit; the fixed cylinder (280) which has fixed the rotation guide bearing (282); the rotating chamber (220) which has the upper ring bracket (221) installed inside; the upper ring bracket (221) fitted outside of the rotation guide bearing (282); and the power module (250) located under the rotating cylinder (220).

As shown in FIG. 6A, the power module (250) includes the motor & decelerator, the internal belt (255), the second pulley (256) and clamp piece shown in FIG. 6C.

As shown in FIG. 6B, the motor & decelerator (251) is installed in the motor bracket (258), which is under the fan shaped extended bracket (259) which is formed inside of the fixed cylinder.

The internal belt (255) has gear teeth and installed on inner surface of the rotating cylinder (220).

The second pulley (256), which has gear teeth on outer surface, is connected to the axis of the motor & decelerator (251) and engaged with the internal belt to transfer driving force to the rotating cylinder (220) from the motor & decelerator (251).

As shown in FIG. 6C, multiple clamp piece (257) is inserted, in equal intervals, into the rotating cylinder (220) and internal belt (255) respectively from outside to inside, fastening the internal belt (255) into the inner surface of the rotating cylinder (22).

When the clamp piece (257) fix, fasten the rotating cylinder (220) and the internal belt (255), they are engaged in a way that how bolts and nuts are engaged, in which the clamp piece has threads on outer surface; and the rotating cylinder (220) and the internal belt (255) have corresponding threads on inner surface of passing holes.

In particular, considering length of the clamp piece (257), fastening region with the internal belt (255) is located above the region in which the second pulley is engaged.

On the other hand, the fixed cylinder (280) is located inside of the rotating cylinder (220) in order to engage the internal belt (255) and the second pulley (256), and the fixed cylinder has open space in the region corresponding to the internal belt (255).

The inner space of the fixed cylinder (280) and the rotating cylinder (220) is empty for the charging cable's free movement.

This embodiment can ensure a much larger space than the previous embodiment described, which allows larger rotation angle when needed. This let the charging cable's pulling and lifting larger which strengthen the purpose of the invention.

The charging location detecting sensor (284) and the standby location detecting sensor (285), located on the fan shaped extended bracket (259) in the lower ring bracket (283) of the fixed cylinder (280), and a third sensor mark (263), installed on the second pulley (256), enable detection of rotating direction for charging and/or stand-by and production of stop signal was enabled The present invention, charging system for electric vehicle described above has configuration that after certain operations at the touch screen (110) and the charging socket is disengaged from the socket holding pocket (130), the charging socket lock sensor (131) is activated; and without further signal or action, the power module (250) triggers the rotating chamber's (200) rotation.

When the rotating chamber (200) rotates a certain angle, the third sensor mark (263) installed on the second pulley (256) moves to the charging location detecting sensor (284) position, the Motor & decelerator (251) stops upon signal by the charging location detecting sensor (284) and rotates in the direction of charging; then stops continues operation for charging.

When the charging is completed and the driver mounts the charging socket (320) to the socket holding pocket (130), the charging socket lock sensor (131) triggers the rotating chamber (200) to reverse-rotate in certain angle, then the third sensor mark (263) is detected by the standby location detecting sensor. Then, the system becomes standby mode by stopping rotation.

Above description is only exemplary of the present invention, it should be understood by those of ordinary skill in the art that the above description of the present invention is exemplary, and the exemplary embodiments disclosed herein can be easily modified into other specific forms without departing from the technical spirit or essential features of the present invention. Therefore, the exemplary embodiments described above should be interpreted as illustrative and not limited in any aspect. The scope of the present invention should be interpreted by the following claims, technologies within the scope should be interpreted within the present invention.

REFERENCE NUMBER

- 100: Fixed chamber
- 110: Touch screen
- 120: Charging status indicator
- 130: Socket holding pocket
- 131: Charging socket lock sensor
- 200: Rotating chamber
- 210: Cable guide
- 220: Rotating cylinder
- 221: Upper Ring bracket
- 230: Rotating disk
- 231: Charging cable through hole
- 240: Rotating support module
- 241: Center shaft
- 242: Support bearing
- 243: Bearing cap
- 244: Main pulley
- 245: Support bracket
- 250: Power module
- 251: Motor & Decelerator
- 252: $1^{st}$ pulley
- 253: Power transfer belt
- 254: Motor bracket
- 255: Internal belt
- 256: $2^{nd}$ pulley
- 257: Clamp piece
- 258: Motor bracket
- 259: Extended bracket
- 260: Sensor mark
- 261: $1^{st}$ sensor mark
- 262: $2^{nd}$ sensor mark
- 263: $3^{rd}$ sensor mark
- 270: Rotation sensor
- 271: Rotating direction detecting sensor
- 272: Reverse rotation detecting sensor
- 280: Fixed cylinder
- 281: Charging cable holding bracket
- 282: Rotation guide bearing
- 283: Lower ring bracket
- 284: Charging location detecting sensor
- 285: Stand by location detecting sensor
- 300: Charging cable
- 320: Charging socket

The invention claimed is:

1. A charging system for an electric vehicle comprising:
    a cylindrically shaped fixed chamber wherein a driver can select a charging amount and make a payment;
    a rotating chamber installed on top of the fixed chamber that rotates clockwise or counterclockwise in a certain angle;
    a charging cable that is connected to the rotating chamber on one end and has a charging socket on the other end and is extracted through the rotating chamber,
    wherein, the rotating chamber rotates in a direction to loosen the charging cable in a charging mode and rotates in a reverse direction to wind up the charging cable, and
    where the rotating chamber comprises: a cable guide that guides the charging cable out of the rotating chamber, a rotating cylinder that is hollow inside and is in the form of an opened bottom drum, a fixed cylinder symmetrically located below the rotating cylinder, and a power module that transfers torque to an inner surface of the fixed cylinder.

2. The charging system of claim 1, wherein the fixed chamber comprises:
    a touch screen wherein a driver enters necessary information to charge electricity to an electric vehicle;
    a charging status indicator shaped as a ring, displaying a charging status in a percent according to a driver's selection of either payment amount due or electricity charged; and
    a socket holding pocket, wherein the charging socket is mounted and a charging socket lock sensor senses a lock status of the charging socket.

3. The charging system of claim 1, wherein the rotating chamber comprises:
    a rotating disk which rotates the rotating cylinder above, and has a charging cable through hole, and formed as part of the opened bottom drum;
    wherein the fixed cylinder is symmetrically located below the rotating disk;
    a rotating support module installed below the rotating disk in center and rotates the rotating disk; and
    wherein the power module transfers torque to the rotating support module.

4. The charging system of claim 3, wherein the rotating support module comprises:

a center shaft, that is upright and supported by a support bracket, and that supports the rotating disk;
a main pulley, that is fitted outside of the center shaft and that receives torque from the power module, that rotates the rotating disk above;
a support bearing, installed between the center shaft and the main pulley, that helps rotation of the main pulley fastened to the rotating disk; and
a bearing cap that prevents foreign matters from entry to the support bearing.

5. The charging system of claim 3, wherein the power module comprises:
a motor & decelerator installed on a motor bracket which is on a support bracket;
a first pulley that is connected to an axis of the motor & decelerator; and
a power transfer belt that connects the first pulley and a main pulley.

6. The charging system of claim 3, wherein the rotating chamber comprises:
a sensor mark that includes a first sensor mark and a second sensor mark; and
a rotation sensor, that includes rotating direction detecting sensor and a reverse rotation detecting sensor, that stops rotation of the motor & decelerator in stand-by mode and charging mode by detecting the first sensor mark and the second sensor mark that are each rotating and moving.

7. The charging system of claim 1, wherein the rotating chamber comprises:
an upper ring bracket formed from the rotating cylinder and a lower ring bracket formed from the fixed cylinder; and
a rotation guide bearing, located between the upper ring bracket and the lower ring bracket, that supports rotation of the rotating cylinder.

8. The charging system of claim 7, wherein the power module comprises:
a motor & decelerator fastened under a fan shaped extended bracket in which the extended bracket is formed from the lower ring bracket formed from the lower fixed cylinder;
an internal belt that has gear teeth and that is installed on the inner surface of the rotating cylinder;
a second pulley which has gear teeth on an outer surface and connected to the motor & decelerator's axis, and that engages with the internal belt and transfers torque from the motor & decelerator to the internal belt;
wherein the fixed cylinder has open space for engagement of the second pulley and the internal belt; and
a clamp piece that has threads to fasten the internal belt to the rotating cylinder.

9. A charging system for an electric vehicle comprising:
a cylindrically shaped fixed chamber wherein a driver can select a charging amount and make a payment;
a rotating chamber installed on top of the fixed chamber that rotates clockwise or counterclockwise in a certain angle;
a charging cable that is connected to the rotating chamber on one end and has a charging socket on the other end and is extracted through the rotating chamber,
wherein, the rotating chamber rotates in a direction to loosen the charging cable in a charging mode and rotates in a reverse direction to wind up the charging cable,
wherein the rotating chamber comprises:
a cable guide that guides the charging cable out of the rotating chamber;
a rotating cylinder that is hollow inside and is in the form of an opened bottom drum;
a rotating disk which rotates the rotating cylinder above, and has a charging cable through hole, and formed as part of the opened bottom drum;
a fixed cylinder symmetrically located below the rotating disk;
a rotating support module installed below the rotating disk in center and that rotates the rotating disk;
a power module that transfers torque to the rotating support module;
a sensor mark that includes a first sensor mark and a second sensor mark; and
a rotation sensor that includes a rotating direction detecting sensor and a reverse rotation detecting sensor, that stops rotation of the motor & decelerator in stand-by mode and charging mode by detecting the first sensor mark and the second senor mark are each rotating and moving.

10. The charging system of claim 9, wherein the fixed chamber comprises:
a touch screen wherein a driver enters necessary information to charge electricity to an electric vehicle;
a charging status indicator shaped as a ring, displaying a charging status in a percent according to a driver's selection of either payment amount due or electricity charged; and
a socket holding pocket, wherein the charging socket is mounted and a charging socket lock sensor senses a lock status of the charging socket.

11. The charging system of claim 9, wherein the rotating support module comprises:
a center shaft, that is upright and supported by a support bracket, and that supports the rotating disk;
a main pulley, that is fitted outside of the center shaft and that receives torque from the power module, that rotates the rotating disk above;
a support bearing, installed between the center shaft and the main pulley, that helps rotation of the main pulley fastened to the rotating disk; and
a bearing cap that prevents foreign matters from entry to the support bearing.

12. The charging system of claim 9, wherein the power module comprises:
a motor & decelerator installed on a motor bracket which is on a support bracket;
a first pulley that is connected to an axis of the motor & decelerator; and
a power transfer belt that connects the first pulley and a main pulley.

13. The charging system of claim 9, wherein the power module transfers torque to an inner surface of the fixed cylinder.

14. The charging system of claim 9, wherein the rotating chamber comprises:
an upper ring bracket formed from the rotating cylinder and a lower ring bracket formed from the fixed cylinder; and
a rotation guide bearing, located between the upper ring bracket and the lower ring bracket, that supports rotation of the rotating cylinder.

15. The charging system of claim 14, wherein the power module comprises:

a motor & decelerator fastened under a fan shaped extended bracket in which the extended bracket is formed from the lower ring bracket formed from the lower fixed cylinder;

an internal belt that has gear teeth and that is installed on the inner surface of the rotating cylinder;

a second pulley which has gear teeth on an outer surface and connected to the motor & decelerator's axis, and that engages with the internal belt and transfers torque from the motor & decelerator to the internal belt;

wherein the fixed cylinder has open space for engagement of the second pulley and the internal belt; and a clamp piece that has threads to fasten the internal belt to the rotating cylinder.

\* \* \* \* \*